United States Patent [19]

Jaillet

[11] Patent Number: 4,717,129
[45] Date of Patent: Jan. 5, 1988

[54] TUBE WITH WELDED BOTTOM DESIGN IN PARTICULAR FOR MAKING HIGH-PRESSURE GAS SPRINGS

[75] Inventor: André Jaillet, Auxon Dessus, France
[73] Assignee: Airax, Montferrand-Le-Chateau, France
[21] Appl. No.: 945,237
[22] Filed: Dec. 19, 1986

Related U.S. Application Data

[63] Continuation-in-part of Ser. No. 682,317, Dec. 17, 1984, abandoned.

[30] Foreign Application Priority Data

Dec. 16, 1983 [FR] France .................................. 83 20187

[51] Int. Cl.⁴ .................................................. F16F 9/32
[52] U.S. Cl. .................................................... 267/113
[58] Field of Search ................ 188/322.19; 267/64.11, 267/113, 118, 182

[56] References Cited

U.S. PATENT DOCUMENTS

| | | | |
|---|---|---|---|
| 3,315,902 | 4/1967 | Pollitz | 267/64.11 X |
| 3,366,379 | 1/1968 | McNally | 267/64.11 |
| 3,375,002 | 3/1968 | Breon et al. | 267/64.11 |
| 4,265,344 | 5/1981 | Taylor | 188/322.19 X |

FOREIGN PATENT DOCUMENTS

| | | | |
|---|---|---|---|
| 0042925 | 1/1982 | European Pat. Off. . | |
| 313330 | 7/1919 | Fed. Rep. of Germany . | |
| 3202705 | 8/1983 | Fed. Rep. of Germany | 188/322.19 |
| 376957 | 7/1932 | United Kingdom . | |

OTHER PUBLICATIONS

Patents Abstracts of Japan, vol. 7, No. 5 (M-184) (1150), Jan. 11, 1983, corresponding to Japanese patent No. 57 165 124.
Rapport De Recherche, Republique Francaise, Institut National de la Propirete Industrielle, dated Jul. 18, 1984, Examiner L. Peeters.

*Primary Examiner*—Duane A. Reger
*Attorney, Agent, or Firm*—Staas & Halsey

[57] ABSTRACT

A tube having a welded bottom impermeable to gases under pressure, the tube including (a) a tube body having an end with an inner peripheral edge folded-over toward the interior of the tube body for forming an opening of reduced diameter; and (b) an end piece for forming the welded bottom of the tube, the end piece including a metal disk with an outer diameter substantially smaller than the inner diameter of the tube body and substantially greater than the reduced diameter of the opening of the inner peripheral folded-over edge of the tube end, the disk having at the center thereof a cylindrical outwardly directed projection, the projection having a diameter slightly smaller than the reduced diameter of the opening of the peripheral folded-over edge of the tube end, wherein the end piece is located inside the tube body and joined to the folded-over edge by a welded zone having a metallographical structure of melted or softened metal, the welding zone having an exposed surface in the bottom of a narrow groove formed between the folded-over edge and the projection.

5 Claims, 4 Drawing Figures

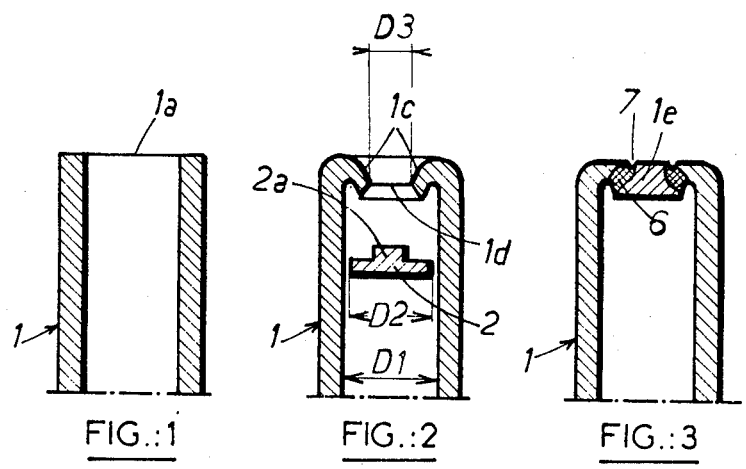
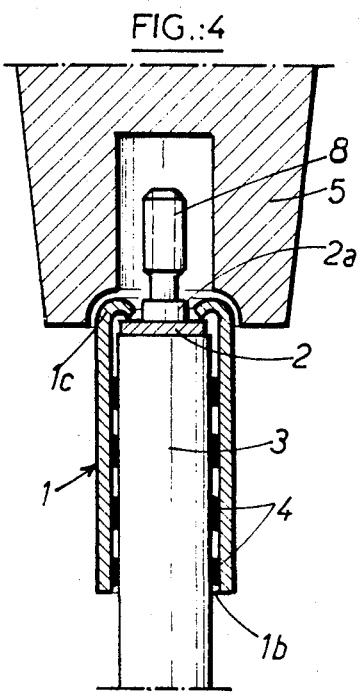

TUBE WITH WELDED BOTTOM DESIGN IN PARTICULAR FOR MAKING HIGH-PRESSURE GAS SPRINGS

This is a continuation-in-part of co-pending application Ser. No. 682,317 filed on 12-17-84, now abandoned.

BACKGROUND OF THE INVENTION

The present invention relates to a tube having a welded bottom, particularly for making a high-pressure gas or pneumatic spring, and to a process for the manufacture thereof.

Pneumatic springs, which are used for example for balancing tailgates of motor vehicles, are known. The good functioning of these springs requires that they should be filled with a gas under a very high internal pressure, which may be as high as 150 bars and sometimes even higher. In order to eliminate all risk of leakage or explosion of the welded-end tube which is the essential component of a pneumatic spring of this kind, it is necessary that the weld joining an end piece intend to form an end face of the tube should be of exceptional quality.

Up to the present time the end piece, consisting of a metal disk whose transverse dimensions are greater than the inside transverse dimensions of the tube, was applied from outside to the open end of the tube, to which the disk was then welded, likewise from outside the tube. The considerable pressure forces applied to the the welded end of a tube of this kind, which is used to make a pneumatic spring, tend to separate the end from the tube, and these forces are taken solely by the weld. It has been found that this process did not enable the risk of explosion to be completely eliminated, for the following reasons: on the one hand, the metal disk intended for closing the tube is sometimes taken from a piece of steel of poor quality, which should have been scrapped but which has by mistake been mixed with pieces of higher quality; and on the other hand, the operation of the welding machine is subject to fluctuations, due in particular to microcuts, brief voltage drops, and so on, which are detrimental to the definitive quality of the weld.

The welded-end tube according to the present invention has on the contrary, particularly at its welded end, strength properties which enable it to be used in particular for the production of a high-pressure pneumatic spring practically free from all risk of leakage or explosion, without it being indispensable to use a very high grade steel for making the end piece of the tube.

British Pat. No. 376,957 issued on July 21, 1932, to Mannesmann-Rohren-Werke et al. discloses a welded-end tube wherein the edge of a first open end of the tube is folded over towards the interior of the tube and an end piece, whose transverse dimensions are between those of the opening bounded by the folded-over edge of the tube and the inside transverse dimensions of the tube, is introduced into the tube and welded to its folded-over edge.

As the result of this arrangement, when the welded-end tube is used for making a high-pressure pneumatic spring the powerful pressure forces which act on its end are not taken solely by the weld but also, and perhaps mainly, by the folded-over edge of the tube, against which the end piece forming its end is applied from the interior of the tube. Moreover, the region of the end piece which is welded to the folded-over edge of the tube is protected by this folded-over edge, which constitutes a kind of protective shield protecting the weld against shocks and above all against corrosion. The external appearance of the end of the tube is also improved, because the welded end has no sharp edge and, if the folded-over edge of the tube has any burrs, these are far less visible.

However, in this arrangement, the welded zones of the tube have a large surface exposed to the external atmosphere, resulting in a high likelihood of corrosion. For this reason, the life of the welded-end tube is substantially reduced, especially if the tube is used in exterior environments. The choice of suitable metals for the tube therefore is also limited.

An object of the present invention is to provide a welded tube of the above-mentioned type, having an improved protection against corrosion.

Another object of the invention is to provide a pneumatic spring comprising a welded tube of the above-mentioned type, having an improved duration of life when used in exterior environments.

According to the invention, there is provided a tube having a welded bottom impermeable to gases under high pressure, the tube comprising (a) a tube body having an end with an inner peripheral edge folded-over toward the interior of the tube body for forming an opening of reduced diameter; and (b) an end piece for forming the welded bottom of the tube, the end piece being a metal disk with an outer diameter substantially smaller than the inner diameter of the tube body and substantially greater than the reduced diameter of the opening of the inner peripheral folded-over edge of the tube end, the disk being provided at the center thereof with a cylindrical outwardly directed projection, the projection having a diameter slightly smaller than the reduced diameter of the opening of the peripheral folded-over edge of the tube end, wherein the end piece is located inside the tube body and joined to the folded-over edge by a welded zone having a metallographical structure of melted or softened metal, the welding zone having an exposed surface in the bottom of a narrow groove formed between the folded-over edge and the projection.

According to an aspect of the invention, the projection supports means, such as a threaded rod or an eyepiece for connecting the tube to another mechanical member, e.g. a support.

According to another aspect of the invention, the projection has a height such that the end face of the tube formed by the end piece and tube has a substantially smooth outer surface.

According to one of the significant features of the present invention, the end piece is provided, at its center, with a cylindrical projection having a diameter which is just slightly smaller than the diameter of the opening bounded by the folded-over edge of the tube. Consequently, the end face of the tube forms a circular narrow groove limited by the folded-ver tube and by the projection. The exposed surface of the welded zone occupies only the bottom of this groove. For this reason, the welded zone is protected against corrosion agents. It can easily be completely protected, for instance, by filling the groove with a protective substance.

A process for the production of a welded-end tube according to the present invention comprises folding over the edge of a first open end of the tube towards the interior of the latter by a cold-forming process such as crimping, rolling, beading or a similar process, engaging the end piece inside the tube by way of its second open end in such a manner as to bring the end piece into contact with the folded-over edge of the tube, and welding the folded-over edge to the end piece in contact with it.

As the pressure forces applied to the welded end of the tube constituting a pneumatic spring are not taken exclusively by the weld, and the latter is only a little or not at all exposed to corrosion, it may be of lower quality, that is to say any slight defects in it are less likely to lead to leaks or even an explosion of the pneumatic spring. For the production of both the tube and its end piece it is therefore possible to select lower grades of weldable steel, which are thus less expensive; for the production of the end piece it is also possible to select a steel better suited to the method of production of this end piece.

BRIEF DESCRIPTION OF THE DRAWINGS

By way of example, a description is given below of one embodiment of the invention, which is illustrated diagrammatically in the accompanying drawings as follows.

FIGS. 1 to 3 are schematic views illustrating diagrammatically the process of manufacture of a welded-end tube according to the present invention.

FIG. 4 is a schematic view illustrating the execution of the process shown in FIGS. 1 to 3 with the aid of two welding electrodes of suitable shapes.

DETAILED DESCRIPTION OF A PREFERRED EMBODIMENT

In the figures of the accompanying drawing, reference numeral 1 designates a tube of weldable steel, with an inside diameter D1 and suitable dimensions for constituting a high-pressure pneumatic spring.

FIG. 1 shows only the part of this tube which is near the end 1a which has to be closed to form an end face. According to the present invention, the edge of this end 1a is folded over towards the interior of the tube, as indicated at 1c in FIG. 2, for example by crimping, rolling, beading or a similar process. An end piece 2 of weldable steel is then made with transverse dimensions, particularly with a diameter D2, intermediate between a diameter D3 of an opening 1d (FIG. 2) bounded by the folded-over edge 1c of the tube and an inside diameter D1 of the tube. The end piece 2 is introduced into the tube 1 by way of the tube's second open end, in such a manner as to bring the end piece 2 into contact with the folded-over edge 1c, to which the end piece 2 is then welded by any suitable method. In the embodiment illustrated in FIGS. 2 and 3, the metal disk constituting the end piece 2 has at its center a cylindrical projection 2a (FIG. 2), the diameter of which is just slightly smaller than that of the opening 1d and the height of which can be so selected that the end face 1e of the tube 1 (FIG. 3) will have, after welding, an almost smooth outer face, exactly like its inner face. Not only does this improve the esthetic appearance of the welded-end tube, but it also effectively protects the weld against corrosion. The welding zone, that is the part of the metal which has been melted or softened during the welding process and has the specific metallographical structure of a melted or softened metal, is shown in FIG. 3 by reference numeral 6. One may see that the welding zone has only a very small exposed surface in the bottom of a groove 7, which has been formed between the folded-over edge 1c of the tube and the projection 2a of the end piece. As shown in FIG. 4, the projection 2a supports an axial threaded rod 8 for joining the tube to a support (not shown).

The end piece 2 intended to form the end face of the tube is preferably welded electrically by the process according to the present invention, which process will now be described with the aid of FIG. 4.

The end piece 2 is laid on the top face of a bottom welding electrode 3, which is preferably cylindrical in shape and has a diameter slightly smaller than the inside diameter of the tube 1 and for example close to that of the end piece 2. The tube 1, with the open end 1a folded over at 1c as previously described with reference to FIG. 2, is then passed, using its second end 1b, over the end piece 2 and the bottom electrode 3; thin rings 4 of electrically insulating material may be interposed between the electrode 3 and the inner wall of the tube 1, these rings being for example fixed on the electrode 3. FIG. 4 clearly shows that the folded-over edge 1c of the tube 1 then comes to lie against the edge of the top face of the end piece 2. A top welding electrode 5 is then brought into contact with the folded-over edge 1c, for example by a downward vertical movement, so as to apply light pressure against the end piece 2. As illustrated in FIG. 4, the lower face of the top electrode 5 has an outside shape adapted to the folded-over edge 1c. The passage of an electric current of determined characteristics between the two electrodes 3 and 5 is then sufficient to bring about effective welding of the end piece 2 to the folded-over edge 1c of the tube 1. After the top electrode 5 has been lifted off, the welded-end tube is freed from the bottom electrode 3.

The shape of the welding electrodes and also their forward and return movements are preferred but a matter of option. This also applies to the shape of the bottom face of the top electrode. The shape of the end piece 2, particularly its upper face (FIG. 2), is preferred but a matter of option, provided it has the cylindrical projection 2a. The shape of the folded-over edge of the first end of the tube is also preferred but a matter of option; it depends in particular on the process used to form it; for example, the edge folded over towards the interior of the tube could be applied against the inner wall of the latter.

I claim:

1. A tube having a welded bottom impermeable to gases under pressure, the tube comprising:
    (a) a tube body having end with an inner peripheral edge folded-over toward the interior of the tube body for forming an opening of reduced diameter; and
    (b) an end piece for forming the welded bottom of the tube, the end piece including a metal disk with an outer diameter substantially smaller than the inner diameter of the tube body and substantially greater than the reduced diameter of the opening of the inner peripheral folded-over edge of said tube end, said disk having at the center thereof a cylindrical outwardly directed projection, said projecting having a diameter slightly smaller than the reduced diameter of the opening of the peripheral folded-over edge of said tube end, wherein said end piece is located inside the tube body and joined to said folded-over edge by a welded zone having a metallographical structure of melted or softened metal, said welding zone having an exposed surface in the bottom of a narrow groove formed between said folded-over edge and said projection, and a protective substance is provided in said groove formed between said folded-over edge and said projection.

2. A tube according to claim 1, further comprising means for connecting the tube to another member, said connecting means being supported by said projection.

3. A tube according to claim 1, wherein said projection has a height such that the end face of the tube formed by the end piece and tube has a substantially smooth outer surface.

4. A pneumatic spring comprising:
   (a) a tube having a welded bottom impermeable to gases under high pressure, the tube including
   (i) a tube body having an end with an inner peripheral edge folded over toward the interior of the tube body forming an opening of reduced diameter, and
   (ii) an end piece for forming the welded bottom of the tube, the end piece including a metal disk with an outer diameter substantially smaller than the inner diameter of the tube body and substantially smaller than the inner diameter of the tube body and substantially greater than the reduced diameter of the opening of the inner peripheral folded-over edge of said tube end, said disk having at the center thereof a cylindrical outwardly directed projection, said projection having a diameter slightly smaller than the reduced diameter of the opening of the peripheral folded-over edge of said tube end, wherein said end piece is located inside the tube body and joined to said folded-over edge by a welded zone having a metallographical structure of melted or softened metal, said welding zone having an exposed surface in the bottom of a narrow groove formed between said folded-over edge and said projection; and a protective substance is provided in said groove formed between said folded-over edge and said projection.

5. The spring of claim 1, wherein said projection has a height such that the end piece of the tube formed by the end piece has a substantially smooth outer surface.

* * * * *